Nov. 22, 1960 W. J. KATZ ET AL 2,961,100
APPARATUS FOR SEPARATION OF LIQUIDS OR SOLIDS FROM A LIQUID
Filed March 2, 1959

INVENTORS
ARTHUR C. LIND
WILLIAM J. KATZ
BY
Ernst W. Schultz
ATTORNEY

United States Patent Office 2,961,100
Patented Nov. 22, 1960

2,961,100

APPARATUS FOR SEPARATION OF LIQUIDS OR SOLIDS FROM A LIQUID

William J. Katz, Milwaukee, and Arthur C. Lind, Wauwatosa, Wis., assignors to Chain Belt Company, Milwaukee, Wis., a corporation of Wisconsin Filed Mar. 2, 1959, Ser. No. 796,558

6 Claims. (Cl. 210—519)

This invention relates to settling tanks and this application is a continuation-in-part of the copending application of the present inventors, Serial No. 728,129 and filed April 14, 1958, for Apparatus for Separation of Liquids or Solids from a Liquid.

The present invention particularly relates to large settling or liquid clarification tanks for sewage treatment wherein, according to the copending application referred to, the raw flow is introduced into the tank to flow from the periphery of the tank to an outlet located at or near the center of the tank.

In a sewage treatment tank of the larger size which may be over 100 feet in diameter, the influent must be distributed uniformly throughout the periphery of the tank or over an area 300 feet or more in length. Because of the low velocity and energy involved, any non-uniformity in such distribution may result in severe short-circuiting of the tank or lack of operating stability.

The effect of short-circuiting is to allow a part of the flow to stream through the tank at a higher velocity and without allowing the solids to first settle out. The lack of stability referred to occurs particularly in tanks of a large width to depth ratio wherein the flow through the tank is easily influenced by convection currents, wind or any other factor which affects the consistent operation of the tank. However, settling out in the distribution system must be avoided.

In carrying out the present invention, the influent feed pipe opens into a feed channel extending around the rim of the tank. The influent from the feed channel passes through ports in the channel wall and into the upper part of an annular distribution chamber within the tank. Said chamber is defined by the wall of the tank and an annular skirt supported therein and has an unobstructed lower opening for the introduction of the influent into the tank. The angular velocity of the flow in the feed channel develops a secondary flow therein which causes the grit or heavy solids to tend to settle out in the channel along the side of the channel toward the center of the tank. Said ports are located at the side of the channel referred to for the discharge of any such settled solids and are disposed to direct the flow against the skirt which effects the lateral distribution of the flow and breaks up the jets from the ports so that the flow approaching the lower opening of the annular chamber is equalized and enters the tank at a uniform rate throughout the area of the lower opening of the chamber referred to. The floor of the channel preferably slopes upwardly from the influent end so that the channel has a diminishing cross section providing a substantially uniform minimum velocity of flow throughout the length thereof.

The bottom of the skirt is uniformly spaced from the floor of the tank so that the flow from the annular distribution chamber and into the tank at maximum flow rates does not wash or scour any given area of the tank floor. The invention provides uniform velocity front approaching the lower edge of the skirt so that no eddy currents are set up in the flow entering the tank and there is no imbalance in the flow to disturb the settled sludges in any parts of the tank.

A principal object of the invention is to provide an improved peripheral-feed, gravity-separation tank which will assure stability of operation and insure against short-circuiting.

Another object is to effect the distribution of the flow throughout the periphery of the tank without any settling of grit in the channels.

Another object of the invention is to provide the complete distribution of the flow throughout the periphery of the tank and so that the raw flow enters the tank with a uniform velocity front across the entire area of the lower end of the chamber.

The drawings furnished herewith illustrate the best mode of carrying out the invention as presently contemplated and set forth hereinafter.

Figure 1:
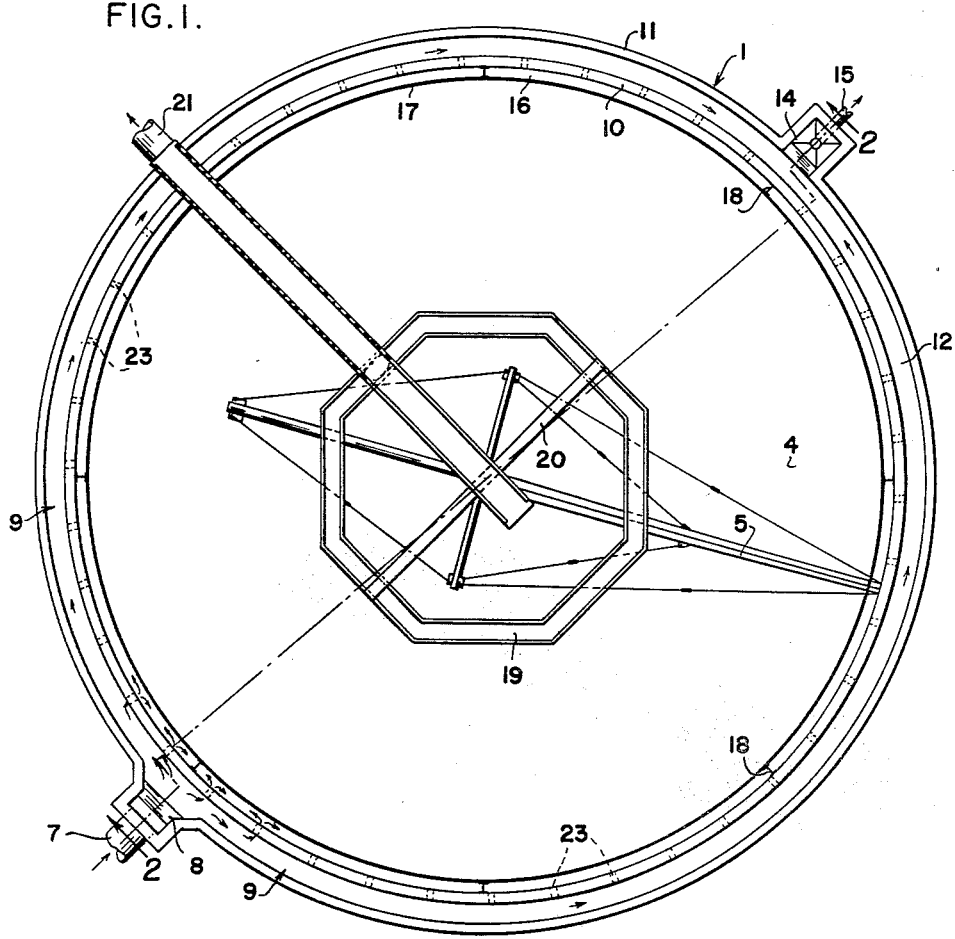
Figure 1 is a plan view of a settling tank of concrete construction for sewage treatment. The rotating structure provided for removing the settled sludge from the floor of the tank is shown in part.

The tank 1 of concrete construction as shown in the drawings includes the circular wall 2 supported on the footings 3, and the floor 4 or tank bottom which slopes downwardly toward the center of the tank. The eductor tube 5 is centrally supported for rotation in tank 1 by the shaft 6 and is hydraulically connected to means, not shown, for the withdrawal of the settled sludge from the tank.

The pipe 7 for delivery of the influent to the tank communicates with the inlet box 8 which opens into the adjacent deep ends of the two channels 9 extending in opposite directions around the tank.

In the tank shown in the drawings the annular channels 9 of concrete construction are supported on wall 2 to form the upper dimensions of the tank. Each channel 9 includes the inner and outer side walls 10 and 11, respectively, and the floor 12. The oppositely adjacent shallow ends of channels 9 communicate with the scum box 14 provided with the discharge pipe 15 for the periodic removal of the scum from the box and channels.

The annular distribution chamber 16 extending around the tank is defined by the steel skirt 17 supported by the brackets 18 secured to the walls 10 of the channels preferably above the water-level of the tank. The water-level referred to is determined by the height of the overflow trough 19 located at the center of the tank. Trough 19 is suspended by the beams 20 and is symmetrical in plan with respect to the center of the tank. The clear surface water at the center of the tank flows over the sides of trough 19 and through the trough to the discharge pipe 21 which extends from trough 19 through wall 2 of the tank below one of the channels 9.

In the operation of the tank, the raw flow enters the channels 9 from the inlet box 8 and flows by gravity toward the opposite, shallow ends of the channels 9. The several ports 23 formed in the inner wall 10 of each channel open from the channel into the upper end of distribution chamber 16 to introduce the raw flow into the upper end of the chamber. The diminishing cross-section of channels 9 provides a substantially uniform velocity of flow throughout their length to minimize the differences in discharge of the ports which would be due to the different velocities of the flow approaching the ports.

Figure 3:
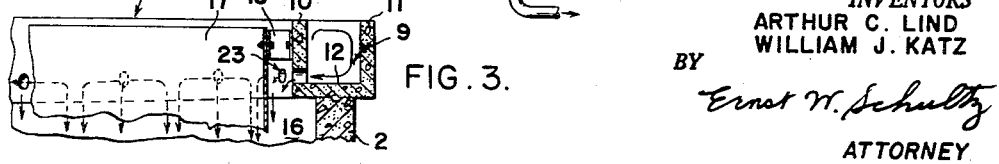
Fig. 3 is an enlarged section taken on line 3—3 of Figure 1 and shows the secondary flow in the channel.

According to the invention, ports 23 open from the lower inside corners of channels 9 and below the water-line of the tank to direct the submerged jets horizontally against the skirt 17. The inside corners of each channel 9 refer to the curvation of each channel around the tank. Although such curvature may have a radius of 50 feet or more, the solids which unavoidably settle on the floor 12 of each channel tend to settle toward the center of the curvature. This tendency appears to be due to the influence of a secondary flow on the relatively light-weight particles. This secondary flow cannot be observed in the channel, but is known to occur in the bends of pipes carrying fluids at considerably greater velocities, and is illustrated in Fig. 3 of the drawings. The flow along the channel floor of slightly reduced velocity is displaced inwardly by the rest of the flow having a slightly greater centrifugal force acting outwardly respecting the curvature of the channel. This secondary flow tends to drive any settled solids into the ports 23 so that the floor 12 of each channel is free of any grit collecting along the inner wall 10.

The grit and heavy solids having passed through ports 23 are able to immediately move downwardly in chamber 16 and to settle on the floor 4 of tank 1. However, the flow from the ports is directed against the skirt 17 and is spread laterally over the surface of the skirt before moving downwardly in chamber 16. The lateral spreading of the jet stream from each port is thus accomplished without the use of any target baffles or the like which might collect rags and would require regular inspection.

The lateral spreading of each jet allows considerable spacing between ports and the use of a minimum number of ports 23 of maximum size for a given total flow through the tank. A port size of three inches in diameter is considered by some to be the minimum to be free of clogging.

The spreading of the jets over the skirt 17, as determined by the location of ports 23, also provides a somewhat greater flow downwardly along the skirt 17. This greater flow is not of itself of advantage but has the effect of reducing the downward velocity of the flow along the wall 2. When the flow reaches the lower end of chamber 16, it of course should have a uniform velocity extending circumferentially of the tank. However, the reduced downward velocity along the entire wall 2 reduces the disturbance of the solids blanket settled on floor 4 by the flow as it leaves the bottom of chamber 16 and turns into the tank. Eddy currents in the flow set up by the jets from ports 23 are dissipated before reaching the bottom of chamber 16 so that the introduction of the flow into the tank is accomplished without setting up such currents where they are free to sweep through the tank and adversely affect its operating efficiency. The flow moving into the tank without disturbing the sludge blanket forming or formed on floor 4 of the tank allows the bottom of the skirt to be spaced from the floor of the tank to provide the optimum opening from chamber 16 into the tank for the full advantage of the large settling zone at the periphery of the tank and including the area directly beneath the chamber.

Figure 2:
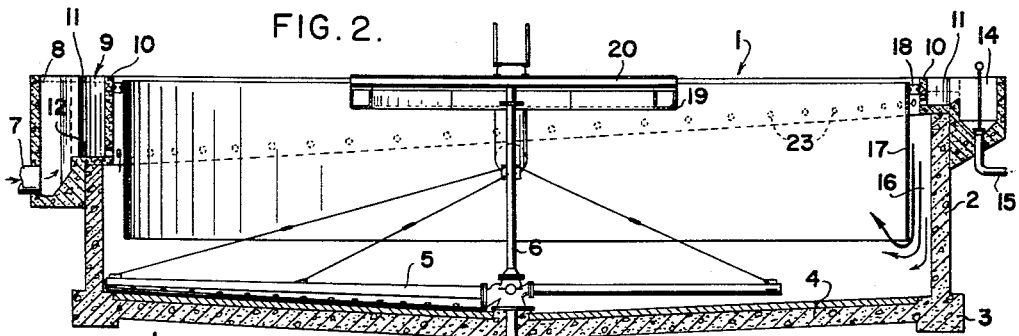
Fig. 2 is a section of the tank taken on line 2—2 of Figure 1.

This improvement is due to the distribution of the flow in chamber 16 between the wall 2 of the tank and skirt 17. As shown by arrows in Fig. 2, the downward velocity in chamber 16 is greater near the the skirt and lesser along the wall 2 of the tank as described. As a result, the flow enters the tank so that the solids settling on floor of the tank are more evenly distributed from the periphery of the tank to the center for maximum settling efficiency and the efficient operation of the eductor 5 or whatever other solids removal means may be employed.

Various modes of carrying out the invention are contemplated as within the scope of the following claims particularly pointing out and distinctly claiming subject matter which is regarded as the invention.

I claim:

1. In a tank for the separation of suspended solids from a liquid, a tank floor, a circular wall forming the sides of the tank, a circular skirt spaced from said floor and said wall and defining therewith an annular chamber having a lower end opening into the tank, effluent means supported within the tank for the withdrawal of the clarified liquid from the center portion of the tank, said wall including structural means defining an open channel having an inlet end for receiving the raw liquid and extending from said inlet end circularly around the tank, and a series of ports formed in said means opening from the lower portion of the channel at the side thereof nearer the center of the tank and into the upper end of said chamber in the direction of the skirt, said ports providing the uniform distribution of the raw liquid into said chamber and being located to receive the solids driven to the said side of the channel by the secondary flow in the channel and to direct the flow of the raw liquid toward the skirt and effect the horizontal distribution of the liquid throughout the chamber.

2. A tank for the separation of suspended solids from a raw liquid, said tank comprising a floor and a lower circular wall, a circular open channel extending around the tank at the upper end thereof and with said lower wall forming the outer dimensions of the tank, said channel including a floor and having ports adjacent thereto and opening inwardly of the tank, a circular skirt spaced from said floor and said wall and said channel and defining therewith an annular chamber having a lower end opening into the tank, a rigid member supported within the tank for the withdrawal of the clarified liquid from the center of the tank, said channel having an inlet end for receiving the raw liquid and providing the uniform distribution of the raw liquid into said chamber, said ports being located and disposed to direct the liquid toward the inside of the skirt for effecting the horizontal distribution of the flow between the ports and throughout the chamber.

3. In a tank for the separation of suspended solids from a liquid, a tank floor, a circular wall forming the sides of the tank, means for removing the settled solids from said floor of the tank, a circular skirt spaced from said floor and said wall and defining therewith an annular chamber having a lower end opening into the tank above said floor, effluent means supported within the tank for the withdrawal of the clarified liquid from the center portion of the tank, said wall including structural means defining an open channel having an inlet end for receiving the raw liquid and extending from said inlet end circularly around the tank, and a series of ports formed in said means opening from the lower portion of the channel at the side thereof nearer the center of the tank and into the upper end of said chamber in the direction of the skirt, said ports being spaced to provide the distribution of the raw liquid throughout the periphery of the tank and opening from the channel and into said chamber to receive any solids driven to the said side of the channel by secondary flow in the channel and to direct the flow of the raw liquid against the skirt to effect the horizontal distribution of the flow between ports while the solids discharged into the chamber are free to move from the ports directly, downwardly through the chamber and to settle therebeneath on the floor of the tank.

4. In a tank for the separation of suspended solids from a raw liquid, said tank including side walls and a floor, an open channel extending around the tank at the upper end thereof and with said wall forming the outer dimensions of the tank, said channel including a floor and having ports opening inwardly of the tank, a circular skirt spaced inwardly of said ports and with the wall of the tank defining an annular chamber having a lower end opening without obstruction into the tank, means for removing the solids settled on said floor of the tank, means supported within the tank for the withdrawal of the clarified liquid from the center of the tank, said channel having an inlet end for receiving the raw liquid and providing the introduction of the raw liquid into said chamber through said ports, said ports being located so that the raw liquid within the chamber moves downwardly along the skirt and around the bottom end of the skirt and into the tank without disturbing the solids settled on the floor therebeneath.

5. In a tank for the gravity separation of suspended solids from a raw liquid, said tank including side walls and a floor, an open channel extending around the tank at the upper end thereof and with said wall forming the outer dimensions of the tank, said channel including a floor and having ports opening inwardly of the tank, a circular skirt spaced inwardly of said ports and with the wall of the tank defining an annular chamber having a lower end opening without obstruction into the tank, means for removing the separated solids from the tank, means within the tank for the withdrawal of the clarified liquid from the center of the tank, said channel having an inlet end for receiving the raw liquid and providing the introduction of the raw liquid into said chamber through said ports, said ports being located at the bottom of the channel and toward the side of the channel nearer any center of the tank so that the solids tending to be carried along said side of the channel as because of secondary flow in the channel are discharged with the flow of the raw liquid.

6. In a tank for the separation of suspended solids from a raw liquid, said tank including side walls and a floor, an open channel extending around the tank at the upper end thereof and with said wall forming the outer dimensions of the tank, said channel including a floor and having ports opening inwardly of the tank, a circular skirt spaced inwardly of said ports and with the wall of the tank defining an annular chamber having a lower end opening without obstruction into the tank, means for removing the solids settled on said floor of the tank, means supported within the tank for the withdrawal of the clarified liquid from the center of the tank, said channel having an inlet end for receiving the raw liquid and providing the introduction of the raw liquid into said chamber through said ports, said ports being located so that the raw liquid within the chamber is discharged against the skirt and distributed laterally and thereafter moves downwardly within the chamber, said flow being thereby uniformly distributed around the tank and distributed within the chamber from the wall to the skirt so that a slightly greater portion of the flow moves downwardly along the skirt and the flow enters the tank with little or no disturbance of the solids settled on the floor therebeneath.

References Cited in the file of this patent

UNITED STATES PATENTS

| | | |
|---|---|---|
| 1,065,542 | Main | June 24, 1913 |
| 2,051,149 | Nordell | Aug. 18, 1936 |
| 2,340,226 | Roberts et al. | Jan. 25, 1944 |
| 2,418,950 | Montgomery | Apr. 15, 1947 |
| 2,436,749 | Galandak et al. | Feb. 24, 1948 |